United States Patent
Kirn

[11] Patent Number: 5,708,333
[45] Date of Patent: Jan. 13, 1998

[54] SERIES-WOUND MOTOR WITH A BRAKING ELEMENT

[75] Inventor: Manfred Kirn, Stuttgart, Germany

[73] Assignee: Robert Bosch GmbH, Stuttgart, Germany

[21] Appl. No.: 609,158

[22] Filed: Feb. 29, 1996

[30] Foreign Application Priority Data

Mar. 11, 1995 [DE] Germany ............ 195 08 881.6

[51] Int. Cl.⁶ ........................................... H02P 3/20
[52] U.S. Cl. .................... 318/246; 318/245; 318/365; 318/373
[58] Field of Search .................... 318/244, 245, 318/246, 364, 365, 369, 373

[56] References Cited

U.S. PATENT DOCUMENTS 3,965,404  6/1976  Petersen.
5,449,992  9/1995  Geiger et al. .................. 318/362

Primary Examiner—Bentsu Ro
Attorney, Agent, or Firm—Kenyon & Kenyon

[57] ABSTRACT

A series-wound motor, wherein, for braking purposes, the polarity of the armature of the motor is reversed for the opposite direction of rotation. The current supply for the motor is maintained until the armature comes substantially to a standstill and subsequently, the current supply to the motor is interrupted. The braking time is controlled in dependence upon operating parameters. For example, the braking time can be controlled by a predetermined time constant for the interruption of the current supply. To prevent running in the opposite direction, a reversal preventing device can be provided.

13 Claims, 1 Drawing Sheet

SERIES-WOUND MOTOR WITH A BRAKING ELEMENT

FIELD OF THE INVENTION

The present invention related to a series-wound motor having a changeover switch for reversing the polarity of the current flow direction of an armature of the series-wound motor and having a braking element.

BACKGROUND INFORMATION

In electric motors which drive power tools, mechanically and electrically operated braking elements are known for shortening the duration of after-run (coasting) caused by kinetic energy. For example, in accordance with German Patent Application No. 30 55 185 C2, for braking purposes, the polarity of the armature is reversed with respect to a field winding, and a resistor is connected in series to the braking circuit to limit the rheostatic braking current. However, the operation of such an arrangement is only satisfactory within a certain speed range, since the braking current and, thus, the braking torque falls with decreasing speeds and, consequently, the electric motor comes to a standstill more or less because of the bearing or tool friction. To achieve the fastest possible stopping of the portable, motor-operated tool for safety reasons, the braking current would have to be set very high. However, a high braking current results in intensified brush sparking, causing increased wear and tear and shortening the lifetime of the motor.

Another disadvantage is that for the braking operation, the motor must function in the manner of a self-excited generator. However, during alternating current operation of the motor, the required remanence can become zero, so that no braking action sets in and the motor coasts without braking. As a result, the braking time is prolonged considerably.

SUMMARY OF THE INVENTION

In contrast, an advantage of the series-wound motor in accordance with the present invention is that it initially remains effectively connected to the supply voltage because of the reversal of the direction of rotation and, thus, is reliably excited. By reversing the polarity of the direction of rotation, the armature, which has the mechanical tool coupled thereto, is continuously braked until it is at standstill, since rheostatic braking is not necessary. In addition, it is especially advantageous that the braking torque is nearly uniform for the entire braking operation down to the rotational frequency of zero. This is achieved quite advantageously in that the braking duration is dependent upon an operating parameter.

It is particularly advantageous that the braking element interrupts the supply of current to the motor when the rotational speed drops to zero. As a result, the motor is not able to run in the opposite direction.

An especially simple adjustment of the braking time is achieved in that the switch is opened after a predetermined delay time. Thus, the delay time guarantees that the current is interrupted after the switch is actuated, regardless of the load of the electric motor.

It is also advantageous that the braking element has a braking switch which is able to control the switch. This braking switch can preferably be designed as a two-hand control switch (i.e., a so-called dead man's switch), so that when it is released after an operator lets go of the portable, motor-operated tool, the braking operation starts automatically.

The changeover switch and the switch are preferably controlled by an electromagnetic switch or a semiconductor switch which can be used depending on the safety specifications.

It is also possible to advantageously interrupt the current supplied via the switch by measuring instruments which detect a reversal of rotation direction and, thus, switch off the motor current approximately at zero rotational speed.

To prevent the rotation in the opposite direction, a reversal preventing device can be advantageously installed at the appropriate location.

Portable, motor-operated hand tools, such as hedge trimmers, saws, grinders or polishers constitute one preferred application of the series-wound motor. These portable, motor-operated tools usually have dangerous cutting tools on which the operator can easily injure himself or herself.

BRIEF DESCRIPTION OF THE DRAWING

The sole

DETAILED DESCRIPTION OF THE INVENTION

Figure 1:
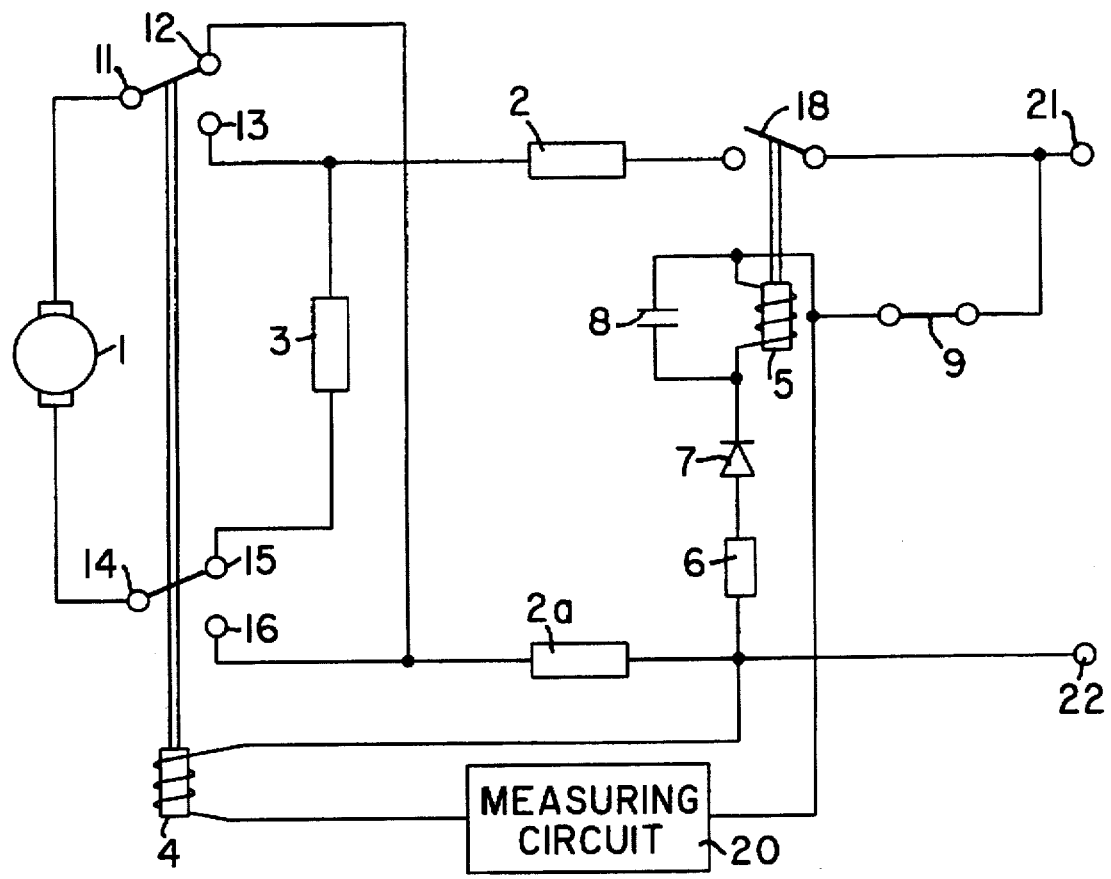
FIG. 1 depicts a circuit diagram of one exemplary embodiment of the present invention.

The FIGURE illustrates a circuit diagram of an exemplary embodiment of the present invention. An armature 1 is linked via two interconnected changeover switches (11, 12, 13) and (14, 15, 16) to two field coils 2, 2a and to the connecting terminals 21, 22 of the current supply.

Usually a 230 volt a.c. voltage is used as the current supply. Alternatively, a battery can be used. If a battery is used, polarization of the connecting terminals 21, 22 is necessary, since in the event of incorrect polarity, no voltage would be applied through the diode 7 at the coil 5 and at the capacitor 8.

A second switch 18 is arranged between the terminal 21 and the field coil 2. The changeover switches 11 through 16, as well as the second switch 18 are controlled by electromagnetic switches 4 or 5; the reference numerals 4, 5 relate to corresponding excitation coils. The coil 4 is connected at one terminal connection to the supply terminal 22 and at its second terminal connection, via a switch 9, to the terminal 21. The switch 9 can be designed for two-hand operation, such as a so-called dead man's switch. Furthermore, the switch 9 is connected to one terminal connection of the coil 5. The second terminal connection of the coil 5 is connected, via a diode 7 and a series resistor 6, with the second connecting terminal 22. A braking resistor (load rheostat) 3 is connected in parallel to the contacts 13, 15 of the changeover switches. The braking resistor 3 is used to adjust the braking current.

In place of the changeover switches 11, 12, 13 or 14, 15, 16 and the switch 18, suitable semiconductor switches could be connected to the coils 4, 5. For example, when working with direct voltage (battery), transistors could be used or when working with a.c. voltage, thyristors could be used.

A capacitor 8 is connected in parallel to the coil 5. The capacitor 8, in combination with the resistor 6 and the diode 7, forms a timing element for the delayed opening of the contact of the switch 18.

The method of operation of this arrangement will now be described. During normal operation, the switches 9, 18 are closed (e.g. in a conductive position). Furthermore, the contacts 11, 13, 14, and 16 of the changeover switches are closed. In this operating state, the current flows from the connecting terminal 21 through the switch 18, the field winding 2, the armature 1, and the field winding 2a back to the terminal 22. In this case, since the coils 4, 5 are electrically connected to the connecting terminals 21, 22, they are excited through the closed switch 9. Furthermore, the capacitor is charged via the timing element 6, 8. If the contact of the switch 9 is opened for braking purposes, in that, for example, the operator puts down the portable, motor-operated tool or lets it slide out of his or her hand, then the coil 4 causes the changeover contacts of the changeover switches to be switched over into the position that terminals 11 and 12 are in contact and terminals 14 and 15 are in contact, as shown in the FIGURE. As a result, the polarity of the armature 1 is reversed for the opposite direction of rotation. However, due to the charging of the capacitor 8, the coil 5 continues to be excited for a specified time, so that the switch 18 remains closed. In the interim, the motor brakes very heavily due to the polarity reversal of the armature, so that the rotational speed is reduced to zero. If the switch 18 is opened (e.g. in a non-conductive position) at this point because the time constant of the timing element 6, 8 of the braking device 4 to 9 has elapsed, then the armature 1 cannot run in the opposite direction, since it is no longer supplied with current. Thus, the braking time can be limited to a predetermined value all the way down to standstill.

In another embodiment of the present invention, the resistor 6 can be designed as a potentiometer, so that the delay time of a portable, motor-operated hand tool equipped with this universal motor can be adjusted externally. This enables the operator to vary the braking time of his or her portable, motor-operated hand tool within certain limits in order to prevent, for example, a strong counter-torque. By adjusting the resistor 3, which determines the braking characteristic and the time constant from the resistor 6 and the capacitor 8, the braking times for specific loads can be so adjusted to one another that the switch 18 opens more or less at the instant of zero rotational speed. This is especially advantageous for hedge trimmers, electric mowers, saws, grinders, planers or the like.

To prevent the motor from running in the opposite direction, a reversal preventing device can be installed, such as a commercially available overrunning clutch (shell). By this means, the delay time can be selected to be longer, for any case, than the braking duration, since the armature cannot run in the opposite direction because of the reversal preventing device. By providing a certain excess of time, even fluctuating loads, for example, as occurs with partially used grinding disks, can be reliably and quickly braked. It is also advantageous to interrupt the supplied current utilizing a measuring device (circuit) 20. The measuring device 20 can be electrically coupled between the switch 9 and the coil 4. The measuring device 20 detects a reversal of a rotation direction (especially during braking of the armature 1), and switches off the motor current at approximately zero rotational speed.

In another embodiment of the present invention, the relay (coil) 4 can also be designed as a mechanical switch for switching the direction of rotation. This changeover switch then has an additional contact, which triggers a time-delay element, discussed above in accordance with the FIGURE, and then opens the switch 18 after expiration of the time constants. Of course, the time delay can also be effected mechanically with the help of an appropriate damper.

One preferred application of the universal motor according to the present invention is for a portable, motor-operated hand tool, such as a hedge trimmer, an electric mower, a saw, a grinder or stretcher. With the help of the braking element, the braking time following the switching off of the portable, motor-operated tool can be reduced to a minimum value.

For the sake of clarity, items such as the main switch or indicators for the voltage supply and the like, have not been shown in the FIGURE.

What is claimed is:

1. A series-wound motor having an armature, the series-wound motor comprising:
    a changeover switch for reversing a polarity of a current flow direction to the armature;
    a second switch coupled to the changeover switch, the second switch having a conductive position and a non-conductive position; and
    a braking element coupled to the second switch and switching the second switch from the conductive position to the non-conductive position (i) in response to an actuation of the changeover switch, (ii) in dependence upon a predetermined operating parameter and (iii) when the armature reaches a substantially standstill position.

2. The series-wound motor according to claim 1, wherein the braking element includes a timing element having a specified delay time, the braking element switching the second switch from the conductive position to the non-conductive position as a function of the specified delay time.

3. The series-wound motor according to claim 2, wherein the timing element includes a potentiometer connected in series with a capacitor.

4. The series-wound motor according to claim 2, wherein the specified delay time is greater than a braking duration of the armature.

5. The series-wound motor according to claim 1, further comprising:
    a braking switch for controlling the braking element, the braking switch being connected to a supply terminal of a power supply.

6. The series-wound motor according to claim 5, wherein the braking switch is designed for a two-hand operation by an operator.

7. The series-wound motor according to claim 1, further comprising;
    electrical actuators for electrically actuating at least one of the changeover switch and the second switch.

8. The series-wound motor according to claim 7, further comprising:
    a braking switch for controlling the braking element, the braking switch being coupled to a supply terminal of a power supply, wherein the electrical actuators include electromagnetic switches controlled via the braking switch.

9. The series-wound motor according to claim 7, further comprising:
    a braking switch for controlling the braking element, the braking switch being coupled to a supply terminal of a power supply, wherein the electrical actuators are controlled via the braking switch.

10. The series-wound motor according to claim 1, wherein the braking element further includes a measuring circuit which detects a rotational direction of the armature when the armature is braking.

11. The series-wound motor according to claim 1, wherein the series-wound motor is used in a portable, motor-operated tool.

12. The series-wound motor according to claim 11, wherein the portable, motor-operated tool is one of a hedge trimmer, an electric mower, a saw, a grinder, a polisher, and a cutting tool.

13. A series-wound motor having an armature, the series-wound motor comprising:

a changeover switch for reversing a polarity of a current flow direction to the armature;

a switching element electrically connected to the changeover switch, the switching element electrically actuating the changeover switch;

a second switch coupled to the changeover switch, the second switch having a conductive position and a non-conductive position; and a braking element coupled to the second switch and switching the second switch from the conductive position to the non-conductive position (i) in response to the actuation of the changeover switch by the switching element and (ii) in dependence upon a predetermined operating parameter.

* * * * *